United States Patent [19]
Irie

[11] Patent Number: 4,882,428
[45] Date of Patent: Nov. 21, 1989

[54] AZAPORPHYRIN COMPOUNDS

[75] Inventor: Masahiro Irie, Sakai, Japan

[73] Assignee: Mitsubishi Chemical Industries Limited, Tokyo, Japan

[21] Appl. No.: 167,231

[22] Filed: Mar. 11, 1988

[30] Foreign Application Priority Data

Oct. 8, 1987 [JP] Japan .................. 62-254120
Jan. 22, 1988 [JP] Japan .................. 63-11895

[51] Int. Cl.$^4$ .......................... C07D 487/22
[52] U.S. Cl. .................................. 540/121
[58] Field of Search ........... 544/121, 123, 124, 127

[56] References Cited

U.S. PATENT DOCUMENTS 3,637,739  1/1972  Lamure .................. 540/121
3,923,645  12/1975  Anderson et al. ......... 540/121 X

OTHER PUBLICATIONS

Dolphin, David, The Porphyrins, vol. 1, Academic Press 1978, pp. 3 to 9 and 21.

Primary Examiner—Richard L. Raymond
Attorney, Agent, or Firm—Oblon, Spivak, McClelland, Maier & Neustadt

[57] ABSTRACT

A azaporphyrin compound of the formula:

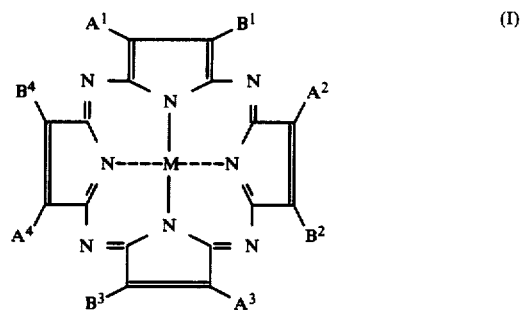

wherein M is 2H, or a metal atom of Group VIII, Ib, IIb, IIIb, IVa, Va, VIa or VIIa of the Periodic Table or its oxide or halide, and each of $A^1$, $A^2$, $A^3$, $A^4$, $B^1$, $B^2$, $B^3$ and $B^4$ is a heterocyclic group, provided that $A^1$ and $B^1$, $A^2$ and $B^2$, $A^3$ and $B^3$, and $A^4$ and $B^4$ are, respectively, cyclizable by irradiation with light to form a cyclohexadiene ring and thereby change the optical properties, and an optical recording material using such a compound wherein information recording can be made by irradiation with light.

8 Claims, 2 Drawing Sheets

AZAPORPHYRIN COMPOUNDS

BACKGROUND OF THE INVENTION

1. Field of the Invention

The present invention relates to a novel photochromic azaporphyrin compound and an optical recording material using it. More particularly, the present invention relates to a novel photochromic azaporphyrin compound which is useful as the substance in various recording or memory materials, photocopying materials, light controlling materials, photosensitive printing materials, laser beam sensitive materials, photoprinting or optical filters, masking materials, actinometers or display materials.

Further, the present invention relates to an optical recording material, wherein information recording can be made by irradiation with light to change the color of a substance contained in the recording layer, and reproduction of the recorded information can be made by reading the difference in the absorbance or the reflectivity between the portion where such a color change has occured and the portion where no such color change has taken place.

2. Discussion of the Background

Various compounds have been known which have photochromic properties and which undergo coloring or discoloring when irradiated with light. Photochromic materials utilizing such properties have been proposed.

For instance, Japanese Unexamined Patent Publication No. 149812/1980 discloses a photochromic material having a spiropyrane compound of the following formula dispersed in a nitrocellulose resin:

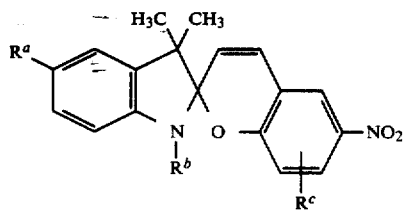

wherein $R^a$ is a hydrogen atom or a halogen atom, $R^b$ is an alkyl group, and $R^c$ is a hydrogen atom or an alkoxy group.

Further, Japanese Examined Patent Publication No. 28892/1970 discloses a photochromic material containing a spironaphthooxazine compound of the formula:

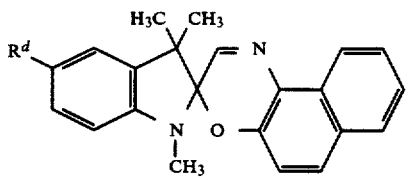

wherein $R^d$ is a hydrogen atom, a halogen atom, a cyano group or an alkyl or alkoxy group having from 1 to 8 carbon atoms.

Meantime, there have been active researches in recent years to employ such photochromic compounds as the substance in reversible optical recording materials. For this purpose, the following conditions are required to be satisfied.

(1) Sensitivity to a semiconductor laser beam
(2) Non-destructive reading out property
(3) Thermal stability of recorded information
(4) Quick response
(5) Durability against repeated operation A photochromic material containing a spirobenzopyrane derivative having a benzothiophyrane ring of the following formula has been proposed as a compound having an improved sensitivity to a semiconductor laser beam under item (1) among the above requirements. (Nobutoshi Asai et al., Collection of preliminary papers for the spring meeting of the Association of Applied Physics, p. 442 (1986))

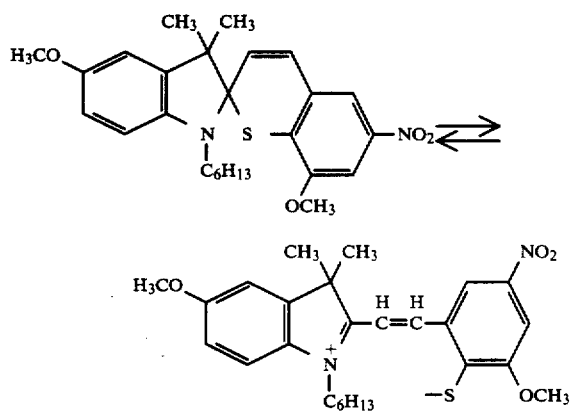

The present inventors have previously proposed in Japanese Unexamined Patent Publication No. 280264/1987 a dithienyldicyanoethene derivative of the following formula which exhibits photochromism, as a compound having an improved thermal stability of recorded information as required under item (3) and an optical recording material using the dithienyldicyanoethene derivative having excellent thermal stability of recorded information.

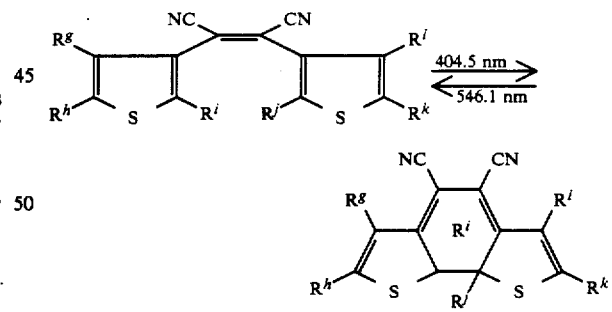

wherein each of $R^g$, $R^h$, $R^i$, $R^j$, $R^k$ and $R^l$ is an alkyl group.

When a photochromic compound is used in an optical recording material, it is important that it has both the thermal stability of recorded information as required under item (3) and the sensitivity to a semiconductor laser beam as required under item (1). However, no optical recording material satisfying both of these requirements have been proposed. The optical recording material containing the above-mentioned spirobenzopyrane derivative is inferior in the thermal stability of recorded information as required under item (3), whereas the one containing dithienyldicyanoethene derivative does not have the sensitivity to a semiconductor laser beam as required under item (1).

SUMMARY OF THE INVENTION

It is an object of the present invention to provide a novel compound which exhibits absorptivity at a wavelength region of semiconductor laser (600–900 nm) and photochromism with excellent thermal stability of recorded information and which is thus suitable for use as the substance in an optical recording material.

Another object of the present invention is to provide an optical recording material using such a compound as a photochromic substance in a recording layer, wherein information recording is effected by irradiation with light to change the color of the substance contained in the recording layer and reproduction of the recorded information is effected by reading the difference in the absorbance or the reflectivity between the portion where such color change has occured and the portion where no such color change as taken place.

The present invention provides an azaporphyrin compound of the formula:

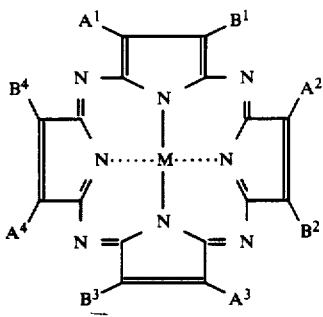

wherein M is 2H, or a metal atom of Group VIII, Ib, IIb, IIIb, IVa, Va, VIa or VIIa of the Periodic Table or its oxide or halide, and each of $A^1$, $A^2$, $A^3$, $A^4$, $B^1$, $B^2$, $B^3$ and $B^4$ is a heterocyclic group, provided that $A^1$ and $B^1$, $A^2$ and $B^2$, $A^3$ and $B^3$, and $A^4$ and $B^4$ are, respectively, cyclizable by irradiation with light to form a cyclohexadiene ring and thereby change the optical properties.

The present invention also provides an optical recording material comprising recording layer containing a photochromic substance capable of reversibly undergoing a color change in such a manner that when irradiated with light, it undergoes a color change and when irradiated with another light having a different wavelength, it returns to the initial color, in which information is recorded by irradiating the recording layer with light, wherein said photochromic substace is a phthalocyanine compound of the formula I as defined above.

DETAILED DESCRIPTION OF THE PREFERRED EMBODIMENTS

Figure 1:
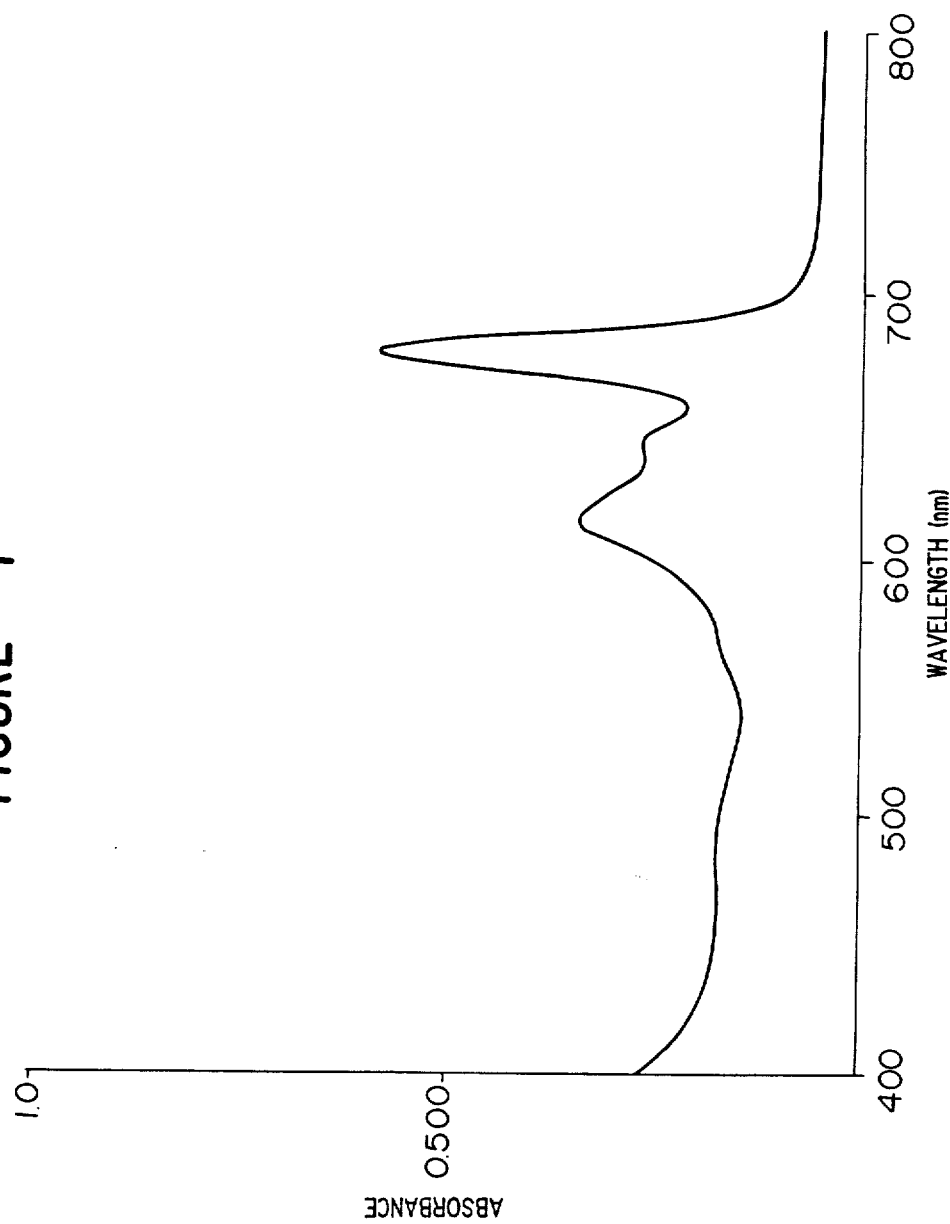
FIG. 1 is an absorption spectrum of the azaporphyrin compound of the present invention prepared in Example 1, wherein the abscissa represents the wavelength (nm) and the ordinate represents the absorbance ($\lambda_{max}$) in o-dichlorobenzene.

Now, the present invention will be described in detail.

The azaporphyrin compound of the present invention has the formula I as defined above.

In the present invention, the heterocyclic group for $A^1$, $A^2$, $A^3$, $A^4$, $B^1$, $B^2$, $B^3$ and $B^4$ has the formula II or III:

wherein

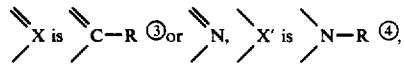

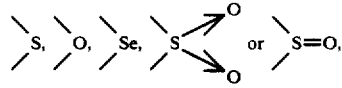

R① is an alkyl group, a halogen atom or a trifluoromethyl group, each of R② and R③ is a hydrogen atom, an alkyl group, a halogen atom, a trifluoromethyl group or a substituted or unsubstituted phenyl group, and R④ is a hydrogen atom or a substituted or unsubstituted alkyl, aryl or cycloalkyl group,

wherein ring A is a hydrocarbon ring or a hetero ring, >Z is

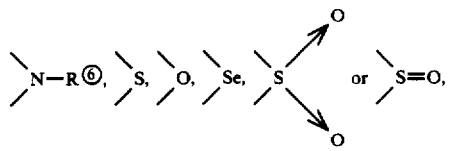

and R⑤ is an alkyl group, a halogen atom or a trifluoromethyl group, wherein R⑥ is a hydrogen atom or a substituted or unsubstituted alkyl, aryl or cycloalkyl group.

Specific examples of the heterocyclic groups include the following.

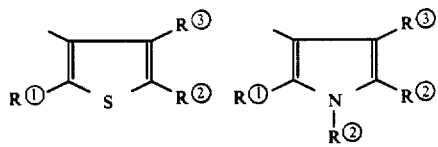

-continued

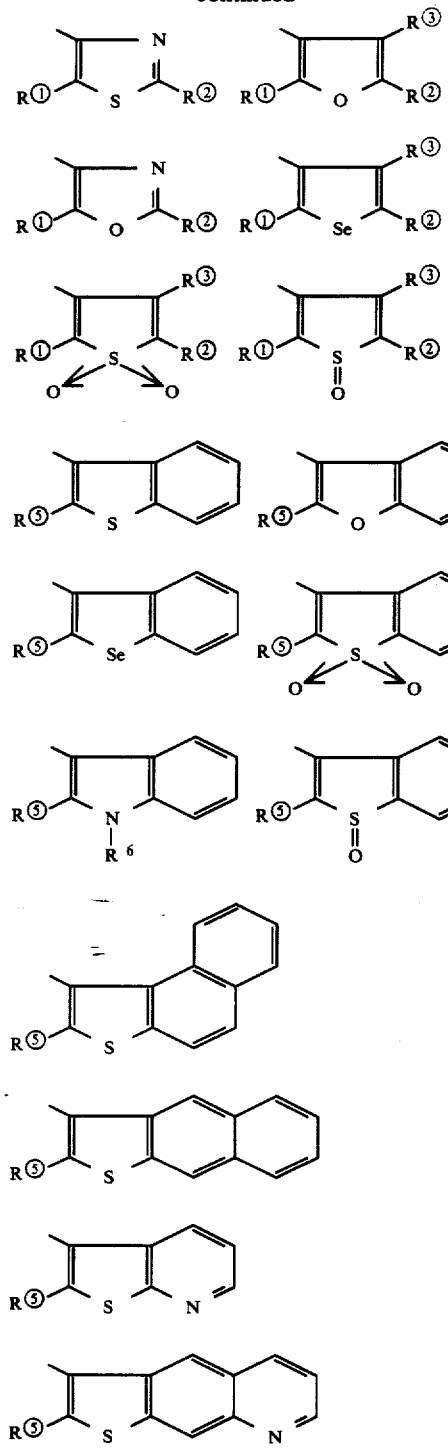

In the above formulas II and III, the alkyl group for R① and R⑤ is preferably an alkyl group having from 1 to 4 carbon atoms such as a methyl group or an ethyl group. The alkyl group for R② and R③ may be a straight chain or branched alkyl group having from 1 to 20 carbon atoms such as a methyl group, an ethyl group, a n-propyl group, an i-propyl group, a n-butyl group, an i-butyl group, a sec-butyl group, a n-pentyl group, a n-heptyl group, a n-hexyl group, a n-octyl group, a 2-ethylhexyl group or a n-stearyl group, preferably an alkyl group having from 1 to 4 carbon atoms.

The halogen atom for R①, R②, R③ and R⑤ includes a fluorine atom, a chlorine atom, a bromine atom and an iodine atom.

The substituent on the phenyl group for R② and R③ may be an alkyl group, an alkoxy group, or a halogen atom. Here, the alkyl group is preferably a lower alkyl group having from 1 to 4 carbon atoms, the alkoxy group is preferably a lower alkoxy group having from 1 to 4 carbon atoms, and the halogen atom includes a fluorine atom, a chlorine atom and a bromine atom.

For R④ and R⑥, the alkyl group is preferably an alkyl group having from 1 to 6 carbon atoms, the aryl group is preferably a phenyl group, and the cycloalkyl group is preferably a cyclohexyl group or a cyclopentyl group. The substituent for such groups includes an alkoxy group, an alkoxyalkoxy group, an alkoxyalkoxyalkoxy group, an allyloxy group, an aryl group, an aryloxy group, a cyano group, a hydroxyl group and a tetrahydrofuryl group.

In the above formula II, a preferred heterocyclic group is a group wherein X is

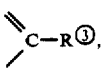

X' is >S, >O or >Se, R① is an alkyl group having from 1 to 4 carbon atoms, and each of R② and R③ is an alkyl group having from 1 to 20 carbon atoms. Particularly preferred is a group wherein X' is >S, and each of R①, R② and R③ is an alkyl group having from 1 to 4 carbon atoms. When X is

it is preferred that X' is >S, and each of R①, R② and R③ is an alkyl group having from 1 to 4 carbon atoms or a phenyl group which is unsubstituted or substituted by a lower alkyl group, a lower alkoxy group or a halogen atom.

On the other hand, in the heterocyclic group of the formula III, Z is preferably

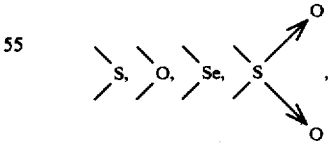

or >S=O, ring A is preferably a benzene ring, a naphthalene ring, a pyridine ring or a quinoline ring, and R⑤ is preferably an alkyl group having from 1 to 4 carbon atoms. Particularly preferably, Z is >S, ring A is a benzene ring and R⑤ is a methyl group or an ethyl group.

The phthalocyanine compound of the present invention is preferbaly a compound of the formula:

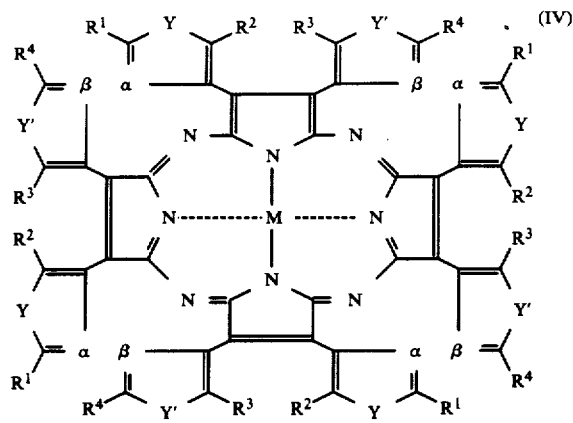 (IV)

wherein M is 2H, or a metal atom of Group VIII, Ib, IIb, IIIb, IVa, Va, VIa or VIIa of the Periodic Table or its oxide or halide, each of

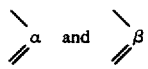

which may be the same or different is

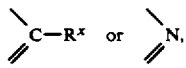

each of Y and Y' which may be the same or different is S, O or Se, each of $R^1$, $R^4$ and $R^x$ is a hydrogen atom, an alkyl group, a halogen atom, a trifluoromethyl group or a substituted or unsubstituted phenyl group, and each of $R^2$ and $R^3$ is a halogen atom, a trifluoromethyl group or an alkyl group.

In the above formula IV, when each of

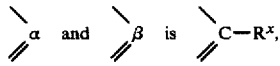

it is preferred that Y and Y' are the same and each represents S, O or Se. Here, particularly preferred is a phthalocyanine compound wherein each Y and Y' is S. Here, each of $R^1$, $R^4$ and $R^x$ is preferably an alkyl group having from 1 to 20 carbon atoms, and each of $R^2$ and $R^3$ is preferably an alkyl group having from 1 to 4 carbon atoms. Each of $R^1$, $R^4$ and $R^x$ is particularly preferably an alkyl group having from 1 to 4 carbon atoms, and each of $R^2$ and $R^3$ is particularly preferably a methyl group or an ethyl group.

On the other hand, when each of

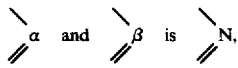

it is preferred that each of Y and Y' is S. Here, each of $R^1$ and $R^4$ is preferably a phenyl group which is substituted or unsubstituted, or a straight chained or branched alkyl group having from 1 to 20 carbon atoms, particularly preferably a phenyl group which may be substituted by a lower alkyl group, a lower alkoxy group or a halogen atom, or a straight chained or branched alkyl group having from 1 to 4 carbon atoms. Here, the preferred alkyl group for $R^2$ and $R^3$ is a straight chained or branched alkyl group having from 1 to 4 carbon atoms such as a methyl group or an ethyl group.

M is preferably 2H, or a metal atom or its oxide or halide, such as Cu, Ni, Zn, VO, Fe, Co or AlCl, particularly preferably Cu, Ni, Co, Zn, Fe or VO.

The compound of the present invention may be prepared, for example, as follows.

Namely, firstly, a dithienyldicyanoethane derivative of the formula:

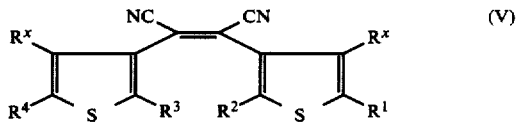 (V)

wherein $R^1$, $R^2$, $R^3$, $R^4$ and $R^x$ are as defined above, is reacted in the presence of metal sodium in an organic solvent such as methanol while blowing in ammonia gas under heating and refluxing, to obtain a diiminoindoline compound of the formula:

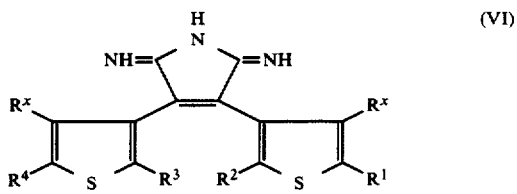 (VI)

wherein $R^1$, $R^2$, $R^3$, $R^4$ and $R^x$ are as defined above. Then, this compound is dissolved in an organic solvent such as 2-(N,N-dimethylamino)ethanol or butanol, and the solution is, as it is (in the case where M is 2H) or after an addition of a metal salt of the formula:

 (VII)

wherein M is as defined above except for 2H, heated and refluxed for cyclization, to obtain a phthalocyanine compound of the formula IV.

The organic solvent to be used for the preparation of the diiminoindoline compound is preferably an alcohol solvent such as ethanol, n-propanol, n-butanol or isopropanol in addition to methanol. Further, as the metal to be used, potassium may be mentioned in addition to sodium. The reaction temperature is preferably from room temperature to 150° C., more preferably from 60° to 90° C.

The organic solvent to be used for the preparation of the azaporphyrin compound from the diiminoindoline compound is preferably an N,N-alkylamino alcohol solvent such as N,N-dimethylaminoethanol, N,N-diethylaminoethanol or N,N-di-n-propylaminoethanol, or a butanol solvent. The reaction temperature is preferably from 80° to 200° C., more preferably from 100° to 150° C.

On the other hand, the present invention provides an optical recording material having such an azaporphyrin compound incorporated in a recording layer, wherein information recording is conducted by irradiation with light by utilizing the photochromic property of the compound whereby it reversibly undergoes a color change when irradiated with light and reproduction of the recorded information is effected by reading the difference in the absorbance or in the reflectivity between the portion where such color change has occured and the portion where no such color change has occured. Namely, the novel azaporphyrin compound of the present invention may be incorporated in a recording layer to obtain an optical recording material in accordance with the following conventional methods.

Namely, an optical recording material may be prepared by forming a recording layer by the following methods:

(a) The azaporphyrin compound of the present invention is dispersed or dissolved in a solvent such as carbon tetrachloride, benzene, cyclohexane, methyl ethyl ketone or tetrachloroethane, if necessary, together with a binder such as polyester resin, polystyrene resin, polyvinyl butyral resin, polyvinylidene chloride, polyvinyl chloride, polymethyl methacrylate, polyvinyl acetate, cellulose acetate, epoxy resin or phenol resin, and then, coated on a suitable substarte.

(b) The azaporphyrin compound of the present invention may be vapor-deposited on a suitable substrate by conventional vapor deposition or co-vapor deposition with other compounds.

(c) The azaporphyrin compound of the present invention is dissolved in a solvent as mentioned above (a), and sealed in e.g. a glass cell.

Among them, an optical recording material of the present invention is preferably prepared by the method (c).

In the method (c), the concentration of the azaporphyrin compound of the present invention in the recording layer sealed in the cell is at least $10^{-5}$ mol/liter.

The substrate to be used in the method (a) may be transparent or opaque to the light to be used.

As the material for the substrate, there may be mentioned glass, plastics, paper, metal sheets or foils, which are commonly employed as supports for recording materials. Among them, plastics are preferred from various standpoints. The plastics include acrylic resin, methacrylic resin, vinyl acetate resin, vinyl chloride resin, nitrocellulose, polyethylene resin, polypropylene resin, polycarbonate resin, polyimide resin and polysulfone resin.

As the coating method, it is possible to employ a conventional film-forming method such as a doctor blade method, a casting method, a spinner method or a dipping method. On the other hand, as the vapor deposition method, a vacuum deposition method or a sputtering method may be employed.

The recording layer formed on such a substrate preferably has a thickness of from 100 Å to 100 μm, more preferably from 1,000 Å to 10 μm. The recording layer may be provided on both sides of the substrate, or may be provided on one side only.

Recording information onto the optical recording material using the azaporphyrin compound of the present invention thus obtained can readily be effected by irradiating the recording layer provided on one side or each side of the substrate or the recording layer in a cell, with a semiconductor laser beam collimated to a beam diameter of from 1 to 10 μm. Thus, the irradiated portion undergoes a color change upon absorption of the light energy. Reproduction of the recorded information can be effected by reading the different in the reflectivity or in the absorbance between the portion where the color change has occured by irradiation and the portion where no such color change has occured.

Now, the present invention will be described in further detail with reference to Examples. However, it should be understood that the present invention is by no means restricted by such specific Examples.

EXAMPLE 1

(1) Preparation of a diiminoindoline compound

To a 50 cc three necked flask, a condenser having a calcium chloride tube, a thermometer and a gas supply tube were attached. Into this flask, 50 ml of dried methanol was charged, and 0.12 g ($5.2 \times 10^{-3}$ mol) of metal sodium and 2.1 g ($6.5 \times 10^{-3}$ mol) of dicyanobis(2,4,5-trimethylthienyl)ethene (molecular weight: 326) of the formula:

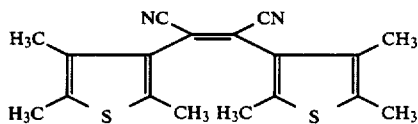

were sequentially dissolved therein. While introducing dried ammonia gas from the gas supply tube, the solution was stirred at room temperature for one hour and then reacted for three hours under reflux. The solvent was distilled off, and the product was separated and purified by silica gel column chromatography to obtain 1.71 g ($4.99 \times 10^{-3}$ mol) (yield: 77%) of a diiminoindoline compound (molecular weight: 343) of the formula:

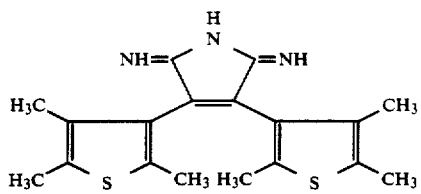

(2) Physical properties of the diiminoindoline compound (i) $^1$H-NMR (CDCL$_3$)

| $\delta =$ 1.76 | s | 3H |
|---|---|---|
| 1.79 | s | 3H |
| 2.07 | s | 3H |
| 2.09 | s | 3H |
| 2.25 | s | 6H |
| 3.60 | br,s | 3H |

(ii) $^{13}$C-NMR (CDCl$_3$)

$\delta = $ 166.5, 136.0, 135.0, 134.8, 131,.8, 131.0, 127.8, 127.7, 14.2, 13.2, 13.0.

(iii) IR (KBr)

1645 cm$^{-1}$ (=NH).

(3) Preparation of an azoporphyrin compound-1

0.5 g ($1.46 \times 10^{-3}$ mol) of the diiminoindoline compound of the formula:

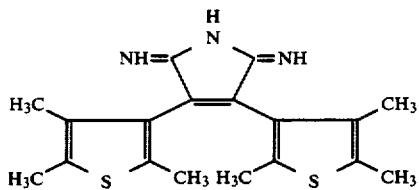

obtained in step (1) was dissolved in 10 ml of 2-(N,N-dimethylamino)ethanol, and the solution was refluxed for 20 hours under heating. This reaction solution was subjected to filtration, and the product was washed a few times with small amounts of methanol and acetone and then dried to obtain 16 mg (yield: 3%) of an azoporphyrin compound (molecular weight: 1,306) of the formula:

pound as obtained in step (3). Further, the filtrate was returned to the reactor and heated for 13 hours. Then, the formed precipitate was collected by filtration, washed with methanol and then with acetone, and dried to obtain 23.8 mg (yield: 16%) of the phthalocyanine compound again. The total amount of the phthalocyanine compound obtained was 36.6 mg (yield: 24.8%).

(5) Physical properties of the azoporphyrin compound

As shown in FIG. 1, the $\lambda_{max}$ (in o-dichlorobenzene) of the azoporphyrin compound obtained in steps (3) and (4) was at 673 nm and 610 nm, and thus the absorption was confirmed to be within the semiconductor laser region (600–900 nm).

EXAMPLE 2

In the same manner as in Example 1 except that instead of 2.1 g of the dicyanobis(2,4,5-trimethylthienyl)e-

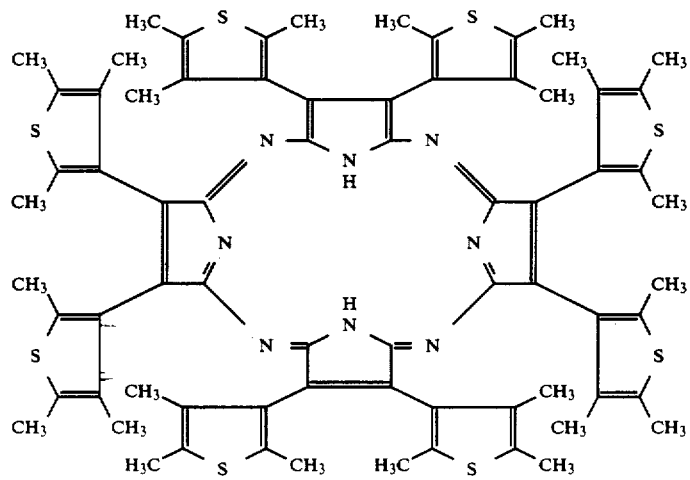

(4) Preparation of an azoporphyrin compound-2

0.15 g of the diiminoindoline compound of the formula:

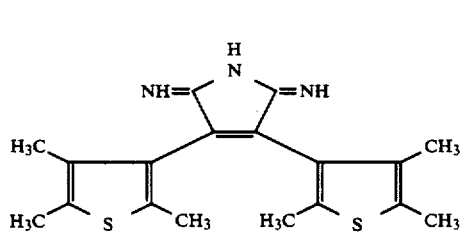

obtained in step (1) was dissolved in 5 ml of dried butanol in a flask equipped with a condenser having a calcium chloride drying tube, and the solution was refluxed under heating. Seven hours later, the formed precipitate was collected by filtration, washed with methanol and then with acetone, and dried to obtain 12.8 mg (yield: 8.5%) of the same phthalocyanine comthene of the formula:

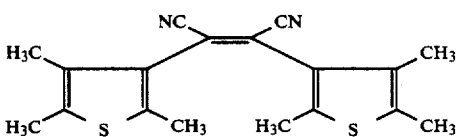

used in Example 1, 2.7 g of a dicyanobis(2,4,5-triethylthienyl)ethene of the formula:

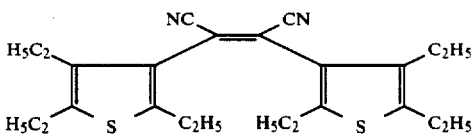

was used, an azoporphyrin compound of the formula:

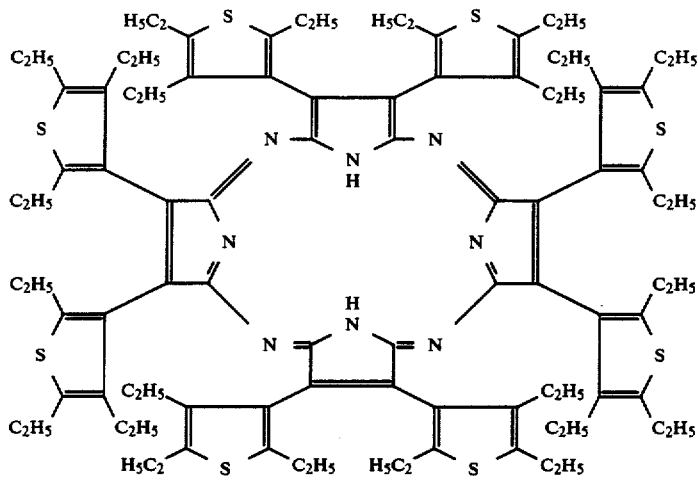

was obtained.

The $\lambda_{max}$ (in o-dichlorobenzene) of this product was at 674 nm and 610 nm, and thus the absorption was confirmed to be within the semiconductor laser region (600–900 nm) like the product obtained in Example 1.

EXAMPLES 3 TO 9

In the same manner as in Example 1, compounds of the formula IV wherein M is 2H, each of Y and Y' is S, and $R^1$ to $R^4$ are alkyl groups as identified in Table 1, were prepared. The $\lambda_{max}$ (in o-dichlorobenzene) of each compound was measured. The results are shown in Table 1.

TABLE 1

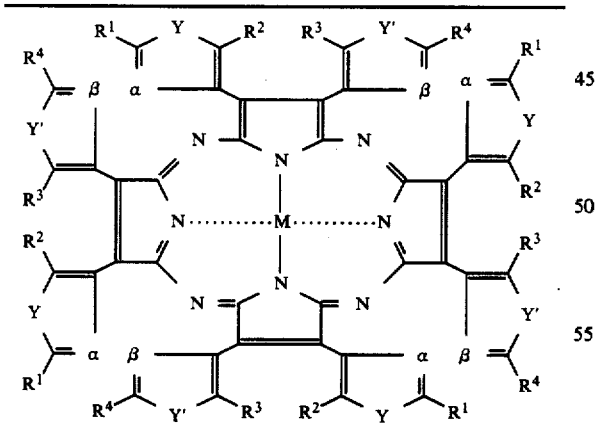

| Example No. | α | β | $R^1$ | $R^2$ | $R^3$ | $R^4$ | M |
|---|---|---|---|---|---|---|---|
| 3 | C—$C_2H_5$ | C—$C_2H_5$ | $C_2H_5$ | $CH_3$ | $CH_3$ | $C_2H_5$ | 2 H |
| 4 | C—$CH_3$ | C—$CH_3$ | $CH_3$ | $C_2H_5$ | $C_2H_5$ | $CH_3$ | " |
| 5 | C—$C_{18}H_{37}$ | C—$C_{18}H_{37}$ | " | $CH_3$ | $CH_3$ | " | " |
| 6 | C—$CH_3$ | C—$CH_3$ | $C_4H_9$ | " | " | $C_4H_9$ | " |
| 7 | C—$C_4H_9$ | C—$CH_3$ | $CH_3$ | " | " | $CH_3$ | " |
| 8 | C—$C_{18}H_{37}$ | C—$CH_3$ | " | " | " | " | " |
| 9 | C—$C_3H_7$ | C—$C_3H_7$ | $C_3H_7$ | " | " | $C_3H_7$ | " |

EXAMPLE 10

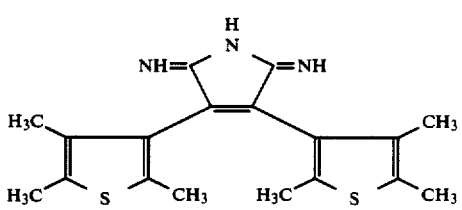

obtained in step (1) of Example 1 and 0.027 g of copper (II) acetate of the formula $Cu(OCOCH_3)_2$ were dissolved in dried butanol, and the solution was refluxed under heating for 20 hours and reacted by using the same apparatus as used in step (4) of Example 1. The reaction mixture was treated in the same manner as in step (4) of Example 1 to obtain 80 mg (yield: 46.8%) of an azoporphyrin compound of the formula:

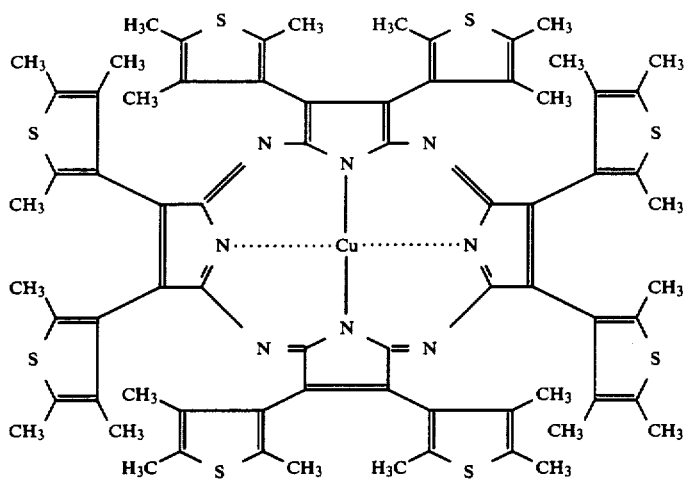

Figure 2:
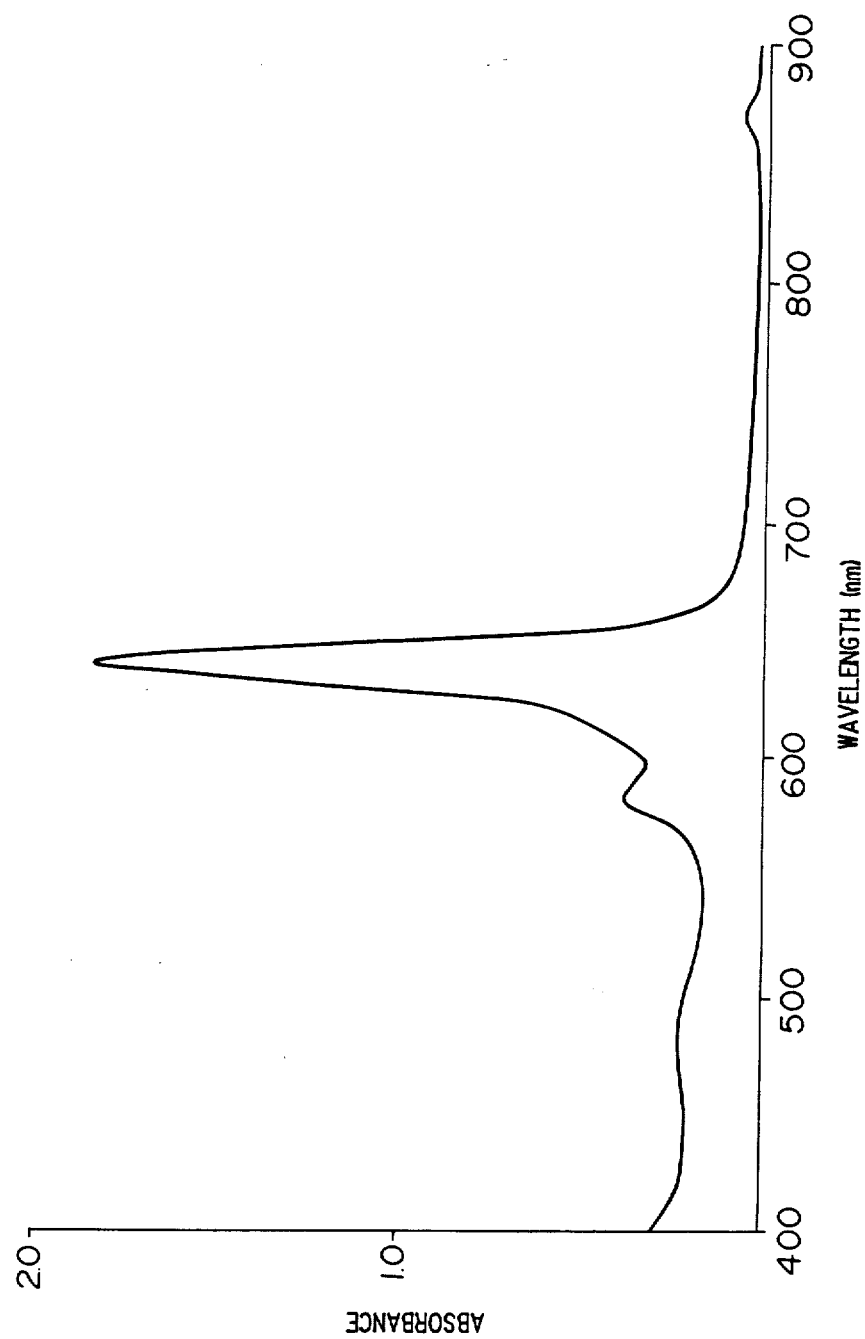
FIG. 2 is an absorption spectrum of the azaporphyrin compound of the present invention prepared in Example 10, wherein the abscissa represents the wavelength (nm) and the ordinate represents the absorbance ($\lambda_{max}$) in chloronaphthalene.

The $\lambda_{max}$ (in chloronaphthalene) of the azoporphyrin compound thus obtained was at 583 nm and 639 nm as shown in FIG. 2, and thus the absorption was found to be within the semiconductor laser region (600–900 nm).

The $\lambda_{max}$ (in 1-methylnaphthalene) of the phthalocyanine compound thus obtained was at 580 nm and 639 nm, and thus the absorption was found to be within the semiconductor laser region (600–900 nm).

EXAMPLE 11

0.13 g of the diiminoindoline compound of the formula:

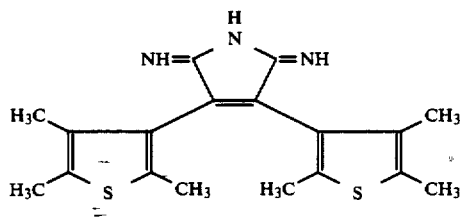

obtained in step (1) of Example 1 and 0.09 of nickel chloride of the formula NiCl$_2$.6H$_2$O were added to 5 ml of dried butanol, and the mixture was refluxed under heating for 20 hours and reacted. The reaction product was treated in the same manner as in step (4) of Example 1 to obtain 2.8 mg (yield: 2.2%) of an azoporphyrin compound of the formula:

EXAMPLE 12

0.50 g of the diiminoindoline compound of the formula:

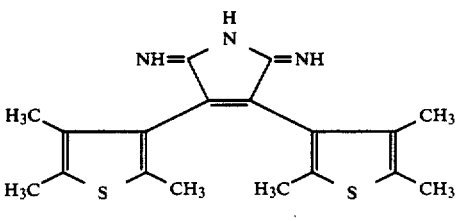

obtained in step (1) of Example 1 was dissolved in 5 ml of dried 2-(N,N-dimethylamino)ethanol, and zinc acetate dihydrate of the formula Zn(OCOCH$_3$)$_2$.2H$_2$O was added thereto. The mixture was refluxed under heating for 20 hours. The formed precipitate was washed with methanol and repeatedly extracted with acetone to obtain 2 mg (yield: 0.4%) of an azoporphyrin compound of the formula:

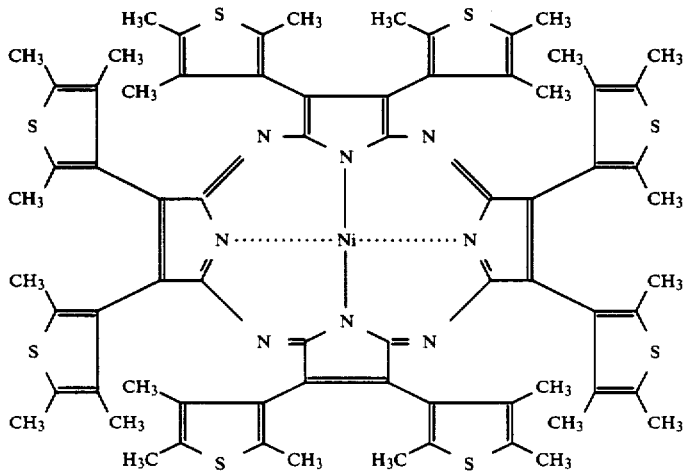

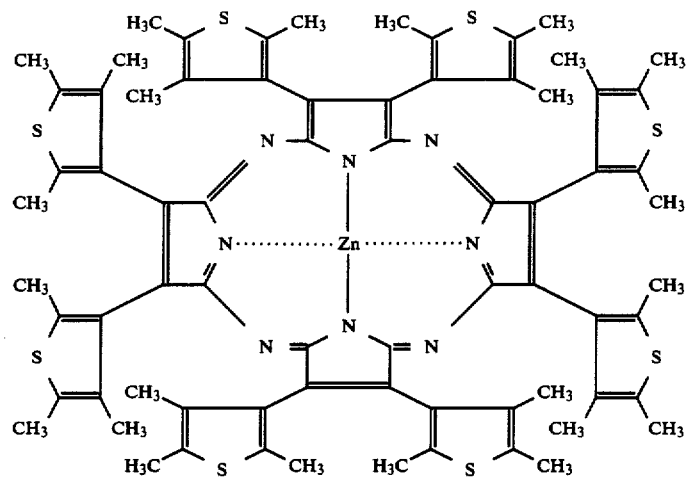

The λ$_{max}$ (in 1-methylnaphthalene) of the phthalocyanine compound thus obtained was at 590 nm and 643 nm, and the absorption was found to be within the semiconductor laser region (600–900 nm).

EXAMPLE 13

(1) Preparation 0.25 g of a diiminoindoline compound of the formula:

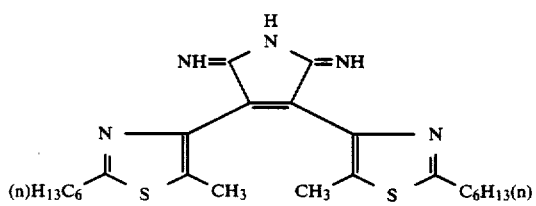

and 0.027 g of copper (II) acetate of the formula Cu(OCOCH$_3$)$_2$ were dissolved in dried butanol, and the solution was refluxed under heating for 20 hours and reacted by using the same apparatus as used in step (4) of Example 1. The reaction mixture was treated in the same manner as in step (4) of Example 1 to obtain 50 mg of a phthalocyanine compound of the formula:

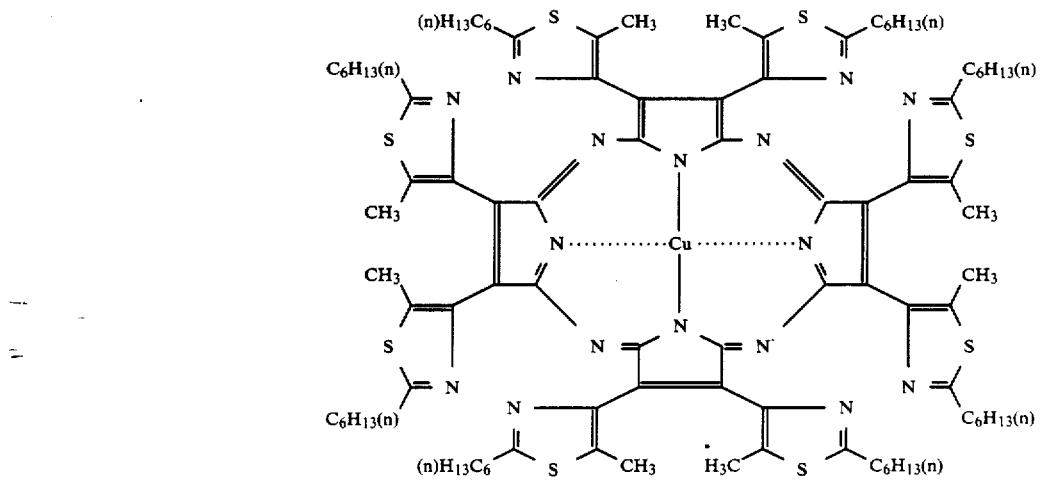

The λ$_{max}$ (in chloronaphthalene) of the azoporphyrin compound thus obtained was at 630 nm and 680 nm, and thus the absorption was found to be within the semiconductor laser region (600–900 nm).

(2) Optical recording

A benzene solution of the compound thus obtained was sealed in a glass cell. This glass cell was irradiated with a monochromatic light of 404.5 nm for two minutes, whereby the initial yellow color turned bluish purple. This colored state was thermally very stable. Then, it was irradiated with a monochromatic light of 680 nm for 5 minutes by a combination of a mercury lamp and a filter, whereby the color immediately faded away. It was possible to repeat this color change reversibly.

EXAMPLES 14 TO 41

In the same manner as in the preceeding Examples, azoporphyrin compounds of the formula IV wherein the substituents are as identified in Table 2 were prepared by suitably selecting the compounds to be reacted. These phthalocyanine compounds were all found to exhibit absorptivity within the semiconductor laser region.

TABLE 2

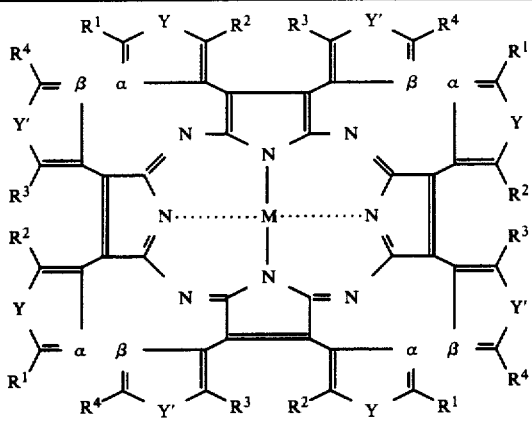

| Example No. | α | β | Y | Y' | R1 | R2 | R3 | R4 | M |
|---|---|---|---|---|---|---|---|---|---|
| 14 | C—CH₃ | C—CH₃ | O | O | CH₃ | CH₃ | CH₃ | CH₃ | 2H |
| 15 | " | " | Se | Se | " | " | " | " | " |
| 16 | N | N | S | S | " | " | " | " | " |
| 17 | C—CH₃ | C—CH₃ | " | " | " | " | " | " | VO |
| 18 | " | " | " | " | " | " | " | " | Fe |
| 19 | " | " | " | " | " | " | " | " | Co |
| 20 | " | " | " | " | " | " | " | " | AlCl |
| 21 | CH₃ | CH₃ | O | O | CH₃ | CH₃ | CH₃ | CH₃ | 2H |
| 22 | " | " | Se | Se | " | " | " | " | " |
| 23 | C—CH₃ | C—CH₃ | S | S | C₂H₅ | " | " | C₂H₅ | Co |
| 24 | CH₃ | CH₃ | " | " | CH₃ | " | " | CH₃ | AlCl |
| 25 | C—CH₃ | N | " | " | " | " | " | " | 2H |
| 26 | CH₃ | CH₃ | " | " | " | " | " | " | VO |
| 27 | " | " | " | " | " | " | " | " | Fe |
| 28 | C—CH₃ | C—CH₃ | S | S | C₂H₅ | C₂H₅ | C₂H₅ | C₂H₅ | Co |
| 29 | C—CH₃ | C—CH₃ | " | " | " | " | " | " | AlCl |
| 30 | " | " | O | O | CH³ | Br | Br | CH₃ | 2H |
| 31 | " | " | Se | Se | " | Cl | Cl | " | " |
| 32 | N | N | S | S | CF₃ | CF₃ | CF₃ | CF₃ | " |
| 33 | CH₃ | CH₃ | " | " | CH₃ | CH₃ | CH₃ | CH₃ | Cu |
| 34 | " | " | " | " | " | " | " | " | Zn |
| 35 | C—CH₃ | C—CH₃ | O | O | CH₃ | C₂H₅ | C₂H₅ | CH₃ | 2H |
| 36 | C—C₂H₅ | C—C₂H₅ | Se | Se | C₂H₅ | " | " | C₂H₅ | " |
| 37 | N | N | S | S | CH₃ | CH₃ | CH₃ | CH₃ | Ni |
| 38 | " | " | " | " | " | " | " | " | VO |
| 39 | C—CH₃ | C—CH₃ | S | S | CF₃ | CF₃ | CF₃ | CF₃ | Fe |
| 40 | N | N | S | S | ⌬ | CH₃ | CH₃ | ⌬ | 2H |
| 41 | " | " | " | " | ⌬—CH₃ | " | " | ⌬—CH₃ | " |

I claim:
1. An azoporphyrin compound of the formula:

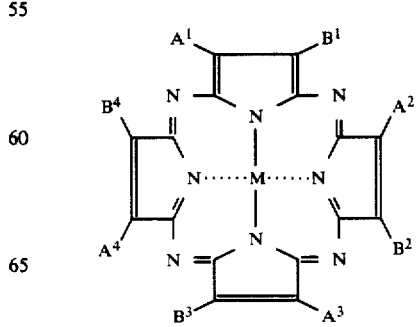

(I)

wherein M is 2H, or a metal atom of Group VIII, Ib, IIb, IIIb, IVa, Va, VIa or VIIa of the Periodic Table or its oxide or halide, and each of $A^1$, $A^2$, $A^3$, $A^4$, $B^1$, $B^2$, $B^3$ and $B^4$ is a group of the formula II or III:

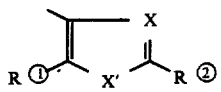
(II)

where

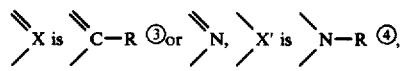

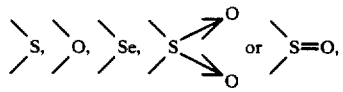

R① is an alkyl group, a halogen atom or a trifluoromethyl group, each of R② and R③ is a hydrogen atom, an alkyl group, a halogen atom, a trifluoromethyl group or a substituted or unsubstituted phenyl group, and R④ is a hydrogen atom or a substituted or unsubstituted alkyl, aryl or cycloalkyl group,

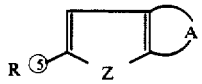
(III)

wherein ring A is a hydrocarbon ring or a hetero ring, Z is

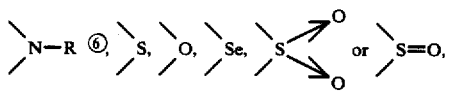

and R⑤ is an alkyl group, a halogen atom or a trifluoromethyl group, wherein R⑥ is a hydrogen atom or a substituted or unsubstituted alkyl, aryl or cycloalkyl group, provided that $A^1$ and $B^1$, $A^2$ and $B^2$, $A^3$ and $B^3$, and $A^4$ and $B^4$ are, respectively, cyclizable by irradiation with light to form a cyclohexadiene ring and thereby change the optical properties.

2. The azoporphyrin compound according to claim 1, which has the formula:

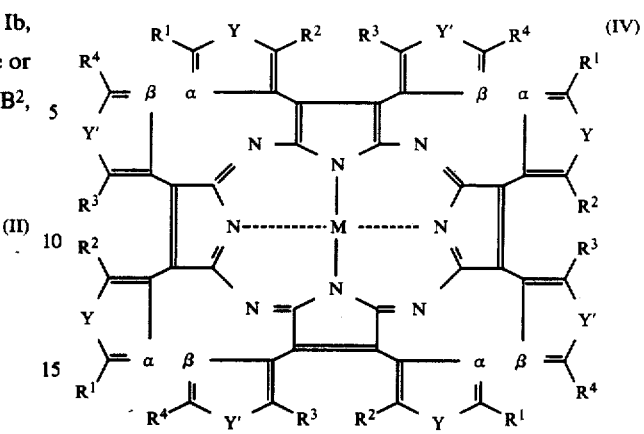
(IV)

wherein M is 2H, or a metal atom of Group VIII, Ib, IIb, IIIb, IVa, Va, VIa or VIIa of the Periodic Table or its oxide or halide, each of

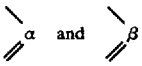

which may be the same or different is

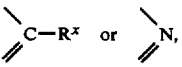

each of Y and Y' which may be the same or different is S, O or Se, each of $R^1$, $R^4$ and $R^x$ is a hydrogen atom, an alkyl group, a halogen atom, a trifluoromethyl group or a substituted or unsubstituted phenyl group, and each of $R^2$ and $R^3$ is a halogen atom, a trifluoromethyl group or an alkyl group.

3. The azoporphyrin compound according to claim 2, wherein in the formula IV, each of

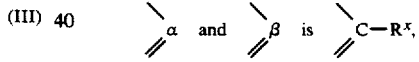

Y and Y' are the same and each represents S, O or Se, each of $R^1$, $R^4$ and $R^x$ is an alkyl group having from 1 to 20 carbon atoms, and each of $R^2$ and $R^3$ is an alkyl group having from 1 to 4 carbon atoms.

4. The azoporphyrin compound according to claim 3, wherein in the formula IV, each of Y and Y' is S, each of $R^1$ and $R^4$ is an alkyl group having from 1 to 4 carbon atoms, and each of $R^2$ and $R^3$ is a methyl group or an ethyl group.

5. The azoporphyrin compound according to claim 2, wherein in the formula IV, each of

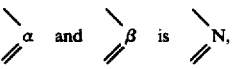

each of Y and Y' is S, each of $R^1$ and $R^4$ is an alkyl group having from 1 to 20 carbon atoms or a substituted or unsubstituted phenyl group, and each of $R^2$ and $R^3$ is an alkyl group having from 1 to 4 carbon atoms.

6. The azoporphyrin compound according to claim 5, wherein in the formula IV, each of $R^1$ and $R^4$ is an alkyl group having from 1 to 4 carbon atoms or a phenyl group which may be substituted by a lower alkyl group, a lower alkoxy group or a halogen atom, and each of $R^2$ and $R^3$ is a methyl group or an ethyl group.

7. The azoporphyrin compound according to claim 1, wherein in the formula I, M is 2H, Cu, Ni, Co, Zn, Fe or VO.

8. The azoporphyrin compound according to claim 1, wherein in the formula I, M is Cu, Ni, Co, Zn, Fe or VO.

* * * * *